United States Patent [19]
Dunbridge et al.

[11] Patent Number: 5,815,116
[45] Date of Patent: Sep. 29, 1998

[54] PERSONAL BEAM CELLULAR COMMUNICATION SYSTEM

[75] Inventors: Barry Dunbridge, Torrance; Robert Y. Huang, Rolling Hills, both of Calif.

[73] Assignee: TRW Inc., Redondo Beach, Calif.

[21] Appl. No.: 592,749

[22] Filed: Nov. 29, 1995

[51] Int. Cl.⁶ .............................. H01Q 3/24; H01Q 3/26
[52] U.S. Cl. ................... 342/373; 342/372; 455/33.3; 379/59
[58] Field of Search .................................. 342/372, 373; 455/33.3; 379/59

[56] References Cited

U.S. PATENT DOCUMENTS

| | | |
|---|---|---|
| 4,901,307 | 2/1990 | Gilhousen et al. . |
| 4,949,092 | 8/1990 | Crail et al. . |
| 5,073,900 | 12/1991 | Mallinckrodt . |
| 5,175,878 | 12/1992 | Davis et al. . |
| 5,191,342 | 3/1993 | Alsup et al. . |
| 5,193,109 | 3/1993 | Chien-Yeh Lee . |
| 5,247,310 | 9/1993 | Waters . |
| 5,248,980 | 9/1993 | Raguenet . |
| 5,262,789 | 11/1993 | Silverstein . |
| 5,293,640 | 3/1994 | Gunmar et al. . |
| 5,295,180 | 3/1994 | Vendetti et al. . |
| 5,303,240 | 4/1994 | Borras et al. . |
| 5,307,075 | 4/1994 | Huynh . |
| 5,307,507 | 4/1994 | Kanai . |
| 5,309,166 | 5/1994 | Collier et al. . |
| 5,333,000 | 7/1994 | Hietala et al. . |
| 5,345,499 | 9/1994 | Benveniste . |
| 5,345,599 | 9/1994 | Paulraj et al. . |
| 5,353,332 | 10/1994 | Raith et al. . |
| 5,355,138 | 10/1994 | Cances et al. . |
| 5,515,378 | 5/1996 | Roy et al. ................................ 370/95.1 |
| 5,548,292 | 8/1996 | Hirshfield et al. ....................... 342/324 |

*Primary Examiner*—Thomas H. Tarcza
*Assistant Examiner*—Dao L. Pham
*Attorney, Agent, or Firm*—Michael S. Yatsko

[57] ABSTRACT

A cellular communication system is provided for transmitting a large number of highly directive personalized communication beams throughout an original geographic cell of the cellular communication system. The system advantageously utilizes a phased array antenna positioned at a center location of the cell in conjunction with a spread spectrum communications method which includes code division multiple access techniques for increasing user capacity. Each of the communication beams represents user signals assigned to specific users located within the original geographic cell and are adjustable in the user's directions. The total number of the communication beams may equal the number of users within the cell. An omnidirectional antenna is positioned in close proximity to the center location of the cell for transmitting and receiving an omnidirectional communication beam for communication with users located within approximately one half of a mile of the center location. A plurality of digital beam forming networks are employed for feeding the phased array antenna with the user signals forming the personalized communication beams.

18 Claims, 4 Drawing Sheets

PERSONAL BEAM CELLULAR COMMUNICATION SYSTEM

BACKGROUND OF THE INVENTION

1. Technical Field

This invention relates generally to a cellular communication system, and more particularly, to a cellular communication system utilizing a phased array antenna in conjunction with a spread spectrum communications method which includes code division multiple access techniques for generating a plurality of highly directive adjustable or fixed personalized communication beams that provide signal coverage to system users throughout an original geographical cell.

2. Discussion of the Related Art

Today's cellular communication systems are constantly subjected to ever increasing user demands, particularly in urban areas. In order to accommodate for such higher user demands, the practice of "cell splitting" has become a common solution for cellular communication systems requiring additional user capacity. The practice of "cell splitting" involves the splitting of a cellular communication system's original geographical cells into smaller geographical cells commonly referred to as "microcells". A "microcell" is commonly defined as a geographical cell having a radius of approximately one thousand feet or less. The practice of "cell splitting" increases a cellular communication system's capacity by increasing the total number of cells, thereby increasing the ability to reuse frequencies between sufficiently isolated cells.

Typically, each of a cellular communication system's original geographical cells employ a base station with an antenna that provides signal coverage throughout a given original cell. Such base stations commonly include an omnidirectional antenna that provides signal coverage throughout the entire original cell or a sectorized antenna that divides the cell into a number of signal coverage sectors. Unfortunately, as an original geographical cell is split into a number of smaller geographical cells, a corresponding number of additional base stations with antennas are required to provide signal coverage within the boundaries of the additional cells. As a result, each time the original geographical cell is split into smaller cells, the cost of the cellular communication system is increased due to the increased hardware costs.

Another problem associated with the practice of "cell splitting" is the increase in the number of "handovers" required as users travel between the increased number of cells. This in turn increases the probability of drop calls within the geographical area previously covered by an original geographical cell. Additionally, the reduced effective radiation area of "microcells" may cause irregular user signal strengths and signal interference between adjacent "microcells".

Figure 1:
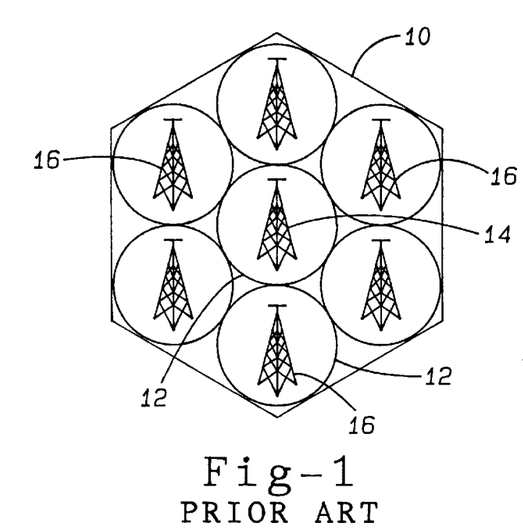
FIG. 1 is a simplified illustration of a prior art cellular communication system utilizing "cell splitting" to increase user capacity.

FIG. 1 illustrates a conventional cellular communication system's original geographical cell 10 that has been split into numerous smaller geographical cells 12. The original cell 10 may have originally included a single base station 14 located at a center location which is now illustrated as providing signal coverage for one of the smaller cells 12. Each of the smaller cells 12 includes an additional base station 16 and an accompanying antenna for providing signal coverage for users located within each of the smaller cells 12. As previously discussed, the addition of the smaller cells 12 increases the costs of providing signal coverage for the users located in the geographical area previously associated with the original geographical cell 10.

As such, it would be desirable to produce a cellular communication system having increased user capacity without requiring "cell splitting" and the additional costs associated therewith. Furthermore, it would be desirable to provide a cellular communication system that utilizes a phased array antenna and user tracking assemblies for transmitting highly directive adjustable or fixed personalized communication beams representing user signals in the directions of each of the system users located within an original geographical cell.

SUMMARY OF THE INVENTION

In accordance with the present invention, a cellular communication system is provided for transmitting highly directive personalized communication beams to system users located within an original geographical cell of the cellular communication system. Each of the personalized communication beams represents user signals assigned to specific users located within the original geographical cell.

In accordance with the first embodiment, a phased array antenna is positioned within the original geographical cell for transmitting and receiving personalized communication beams that are adjustable in the directions of each of the users within the cell. A digital beam forming apparatus feeds the phased array antenna with user signals that form the adjustable personalized communication beams which are transmitted in the individual directions of the system users located within the geographical cell. The digital beam forming apparatus also receives the user signals received by the phased array antenna. A user tracking apparatus provides the digital beam forming apparatus with tracking information regarding the relative amplitudes of the user signals such that the digital beam forming apparatus adjusts each of the user signals to substantially center each of the adjustable personalized communication beams about one of the system users.

In accordance with a preferred embodiment, an omnidirectional antenna is positioned in close proximity to a center location of the geographical cell for transmitting and receiving an omnidirectional communication beam in the directions of the system users traveling within a predetermined range of the center location.

In accordance with a second embodiment, a phased array antenna is positioned within the geographical cell for transmitting and receiving a fixed number of personalized communication beams in fixed directions such that signal coverage is provided throughout the geographical cell. A plurality of digital beam forming networks feed the phased array antenna with user signals that form the fixed personalized communication beams. The plurality of digital beam forming networks also receive the user signals received by the phased array antenna. A plurality of modulating/demodulating networks corresponding to at least the number of the users within the geographical cell modulate and demodulate the user signals assigned to each of the particular users. A switching network switches the plurality of modulating/demodulating networks between the plurality of digital beam forming networks such that each of the system users is assigned to one of the fixed personalized communication beams providing maximum signal coverage with respect to each of the user's locations. A user tracking apparatus tracks each user and provides the switching network with tracking information regarding the amplitudes of the user signals represented by the communication beams. As a result, the aforementioned problems associated with cellular communication system utilizing "cell splitting" to increase user capacity should be substantially eliminated.

BRIEF DESCRIPTION OF THE DRAWINGS

The various advantages of the present invention will become apparent to those skilled in the art after reading the following specification and by reference to the drawings in which.

DETAILED DESCRIPTION OF THE PREFERRED EMBODIMENTS

The following description of the preferred embodiments is merely exemplary in nature and is in no way intended to limit the invention or its application or uses.

Figure 2:
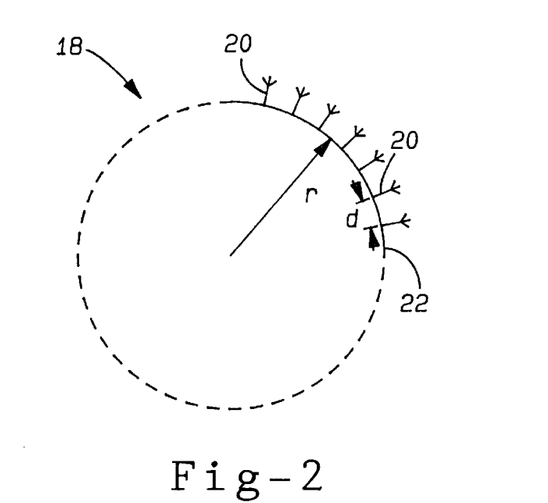
FIG. 2 is simplified illustration of the phased array antenna used in conjunction with the cellular communication system in accordance with the present invention.

FIG. 2 illustrates a phased array antenna 18 that may be used in conjunction with the cellular communication system of the present invention. The phased array antenna 18 includes a plurality of radiating elements 20 which are positioned about a circle 22 having a radius(r) of approximately ten feet. This configuration includes one hundred and twenty of the radiating elements 20 each of which are separated by a distance(d) of approximately six inches. It should be noted that phased array antennas having a different number of radiating elements and different physical configurations may be used in conjunction with the cellular communication system of the present invention.

In accordance with the present invention, the phased array antenna 18 is configured for transmitting a large number of highly directive adjustable or fixed electromagnetic beams of radiation for communication purposes. Each of the communication beams has a beam width of approximately three degrees allowing each of the beams to be substantially centered about an individual user of the system. The high directivity of the communication beams allows each of the beams to be personalized for each user within a cell of the system. In addition, the communication beams are personalized through the use of well known cellular signaling methods such as a spread spectrum communication method which includes code division multiple access (CDMA) techniques wherein a particular user is assigned to a spread spectrum code and a carrier frequency which are retained throughout a cell of the system. The operation of phased array antennas is well known in the art and will not be discussed in detail herein.

Figure 3:
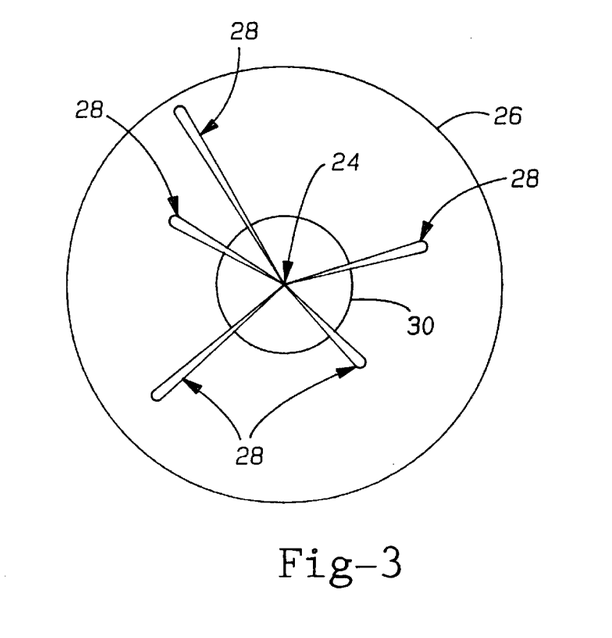
FIG. 3 illustrates the adjustable personalized communication beams transmitted by the phased array antenna to each of the system users located within an original geographical cell of the cellular communication system in accordance with a first embodiment of the present invention.
Figure 8:
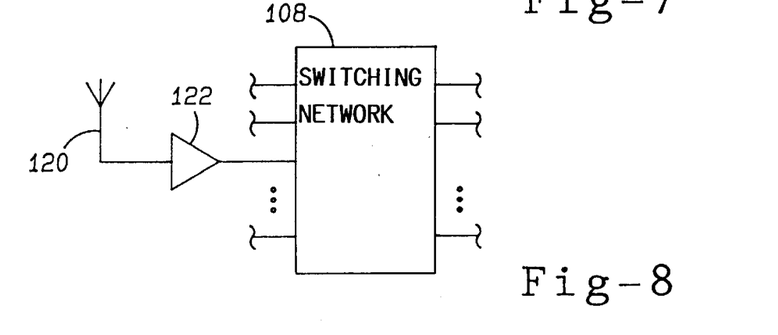
FIG. 8 is a schematic illustration of an omnidirectional antenna for providing signal coverage to users within a predetermined range of the base stations of the cellular communication system in accordance with the first and second embodiments of present invention.

In accordance with the first embodiment of the present invention, FIG. 3 illustrates the phased array antenna 18 mounted to an existing base station located at a center location 24 of an original geographical cell 26 of the cellular communication system. The phased array antenna 18 transmits adjustable personalized communication beams 28 representing user signals in the individual directions of each of the users located within the cell 26. For purposes of simplification, only five of the beams 28 are illustrated, but the number of beams may reach the many thousands. In order to improve signal reception, an omnidirectional antenna, as illustrated in FIG. 8, may be positioned in close proximity to the center location 24 for transmitting an omnidirectional communication beam to users traveling within approximately one half of a mile of the center location 24 as illustrated by a circle 30. The use of the omnidirectional communication beam reduces or eliminates the problem of dropped calls for users which are moving rapidly throughout the area illustrated by the circle 30.

The phased array antenna 18 may also be applied in a "green field" area, i.e. a geographical area which is not presently serviced by a cellular communication system, thereby extending the range and area covered by a newly created cell in such an area while requiring fewer base stations.

Figure 4:
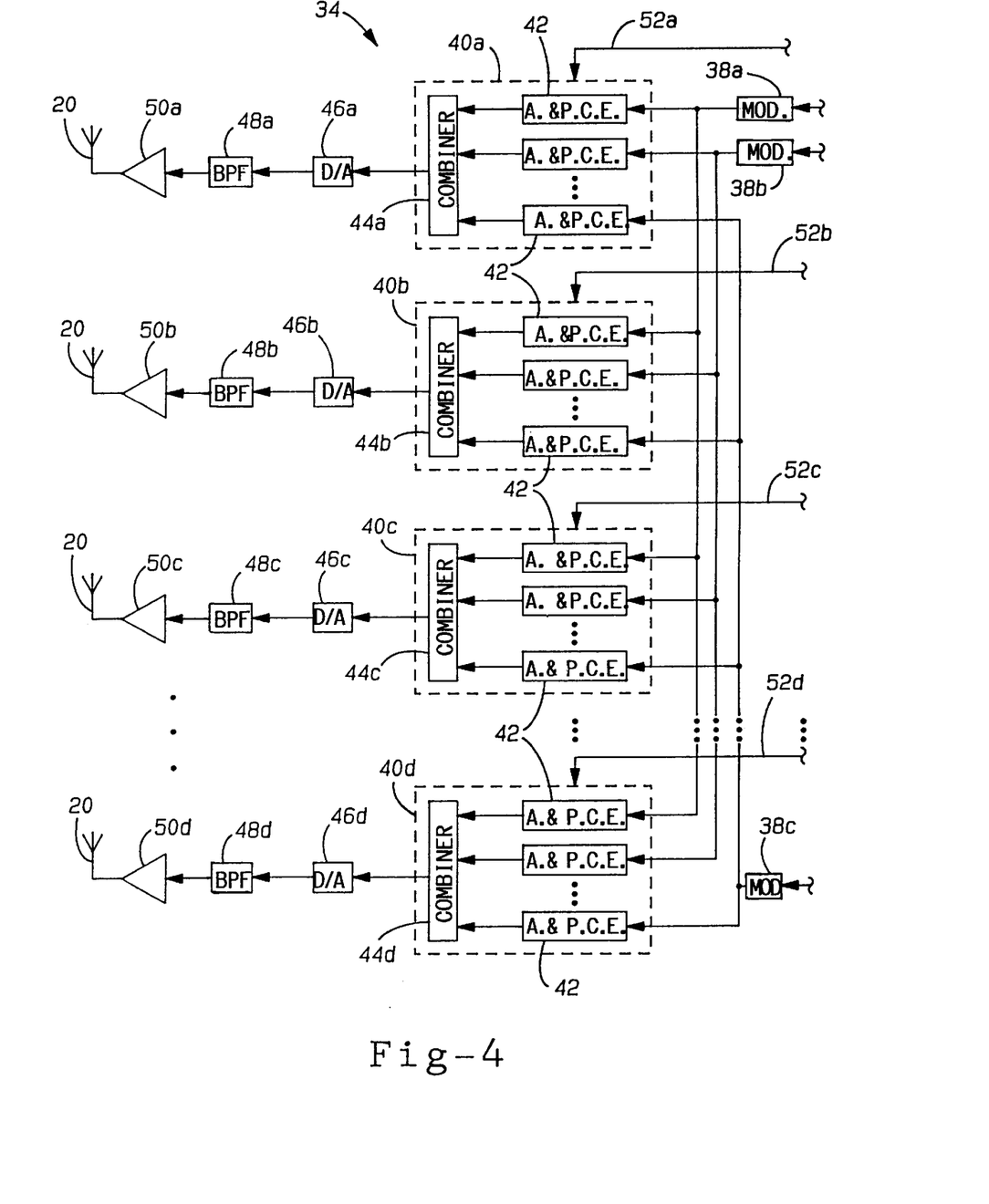
FIG. 4 is a schematic illustration of a portion of the transmitting network of the cellular communication system coupled to the phased array antenna in accordance with the present invention.
Figure 5:
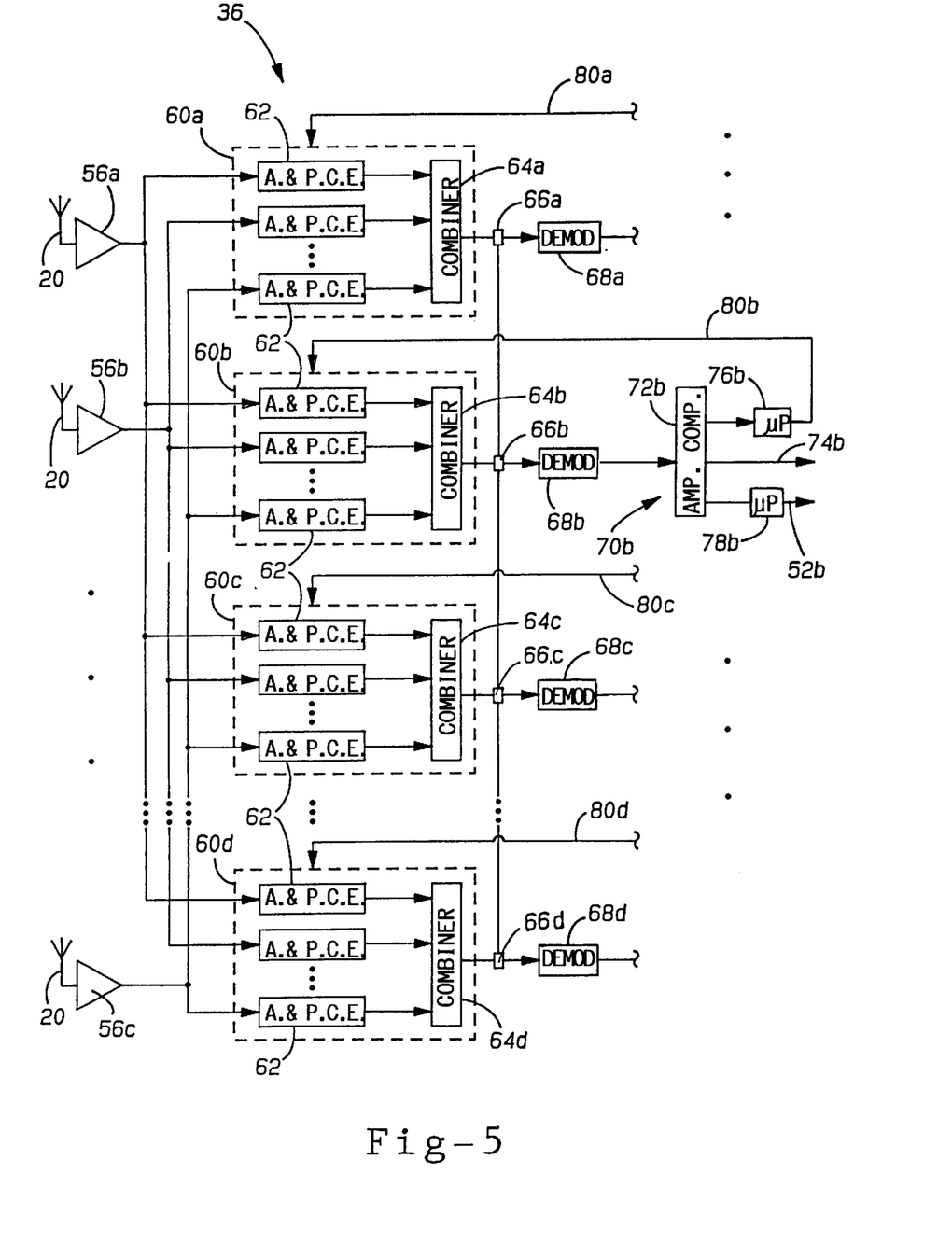
FIG. 5 is a schematic illustration of a portion of the receiving network of the cellular communication system coupled between the phased array antenna and the user tracking assemblies in accordance with the present invention.

FIGS. 4 and 5 respectively illustrate representative portions of a transmitting network 34 and a receiving network 36 of the cellular communication system. Both the transmitting network 34 and the receiving network 36 are coupled to the radiating elements 20 of the phased array antenna 18. As previously discussed, the phased array antenna 18 is located at the center location 24 of the cell 26 of the cellular communication system. For purposes of simplification, only four of the one hundred and twenty radiating elements 20 are illustrated in FIG. 4, and three of the radiating elements 20 are illustrated in FIG. 5. The phased array antenna 18 is used in conjunction with the transmitting network 34 to transmit and adjust the direction of the personalized communication beams 28 representing user signals in the individual directions of each of the users within the cell 26.

Referring to FIG. 4, the representative portion of the transmitting network 34 is illustrated including signal modulators 38a–38c that modulate three user signals that may be received a telephone network (not shown). By way of example, the transmitting network 34 may receive user signals from another base station in the cellular communication system via land based communication lines or additional receivers located within the base station. Such sources of user signals represent other subscribers within the cellular communication system communicating to a particular user. The total number of signal modulators for the transmitting network 34 corresponds to at least the number of system users located within the cell 26. As such, each user is assigned to a unique user signal and one of the personalized communication beams 28 that is retained throughout the entire cell 26.

As previously indicated, the signal modulators 38a–38c advantageously utilize a spread spectrum communication method which includes code division multiple access (CDMA) techniques to increase the number of users that can be accommodated within the allocated frequency spectrum of cell 26 and the cellular communication system. Each of the users within the cell 26 is assigned to a carrier frequency and a code assignment which are retained throughout the cell. Therefore, the problems typically associated with cellular communications systems utilizing "microcells" including, but not limited to, increased "handovers", irregular user signal strengths and interference are substantially eliminated. Additionally, the implementation of CDMA techniques in conjunction with the highly efficient personalized communication beams reduces the transmit power requirements which increases the battery life of user handsets.

The transmitting network 34 is illustrated further including transmitting digital beam forming networks 40a–40d that each include variable amplitude and phase control elements 42 for synthesizing a desired antenna beam shape from the modulated user signals received from each of the signal modulators 38a–38c. The total number of transmitting digital beam forming networks represented by networks 40a–40d corresponds to the number of radiating elements 20 in the phased array antenna 18. Each of the transmitting digital beam forming networks 40a–40d is illustrated including three variable amplitude and phase control elements 42, each corresponding to one of the signal modulators 38a–38c. However, the total of number of variable amplitude and phase control elements 42 in each of the transmitting digital beam forming networks corresponds to the total number signal modulators and, in turn, at least the number of users within the cell 26. Each of the variable amplitude and phase control elements 42 are adjusted to change the relative amplitudes and phases of the modulated user signals such that the personalized communication beams are substantially centered about the individual system users.

Combiners 44a–44d combine the signals received from the amplitude and phase control elements 42 and output synthesized user signals. Each of the synthesized user signals are fed to digital to analog converters 46a–46d, band pass filters 48a–48d, and power amplifiers 50a–50d. The radiating elements 20 transmit the adjustable personalized communication beams 28, representing the modulated signals from the signal modulators 38a–38c, in the individual directions of specific users within the cell 26.

Each of the transmitting digital beam forming networks 40a–40d receive tracking information regarding each of the system users about input lines 52a–52d. This information is used to adjust the amplitude and phase control elements 42 such that the shapes and directions of the personalized communication beams 28 transmitted from each of the radiating elements 20 are adjusted as the system users move throughout the cell 26.

Turning to FIG. 5, the representative portion of the receiving network 36 is illustrated including four receiving beam forming networks 60a–60d that receive the user signals from the radiating elements 20 of the phased array antenna 18. The user signals are amplified and converted to digital signals by the combined preamplifier and analog to digital converter networks 56a–56c. The total number of receiving beam forming networks represented by networks 60a–60d corresponds to at least the number of system users located within the cell 26. Each of the receiving digital beam forming networks 60a–60d is illustrated including three variable amplitude and phase control elements 62 corresponding to the radiating elements 20 for synthesizing desired antenna beam shapes from the received user signals. The total number of the variable amplitude and phase control elements 62 for each of the receiving beam forming networks 60a–60c corresponds to the total number of the radiating elements 20 in the phase array antenna 18.

Combiners 64a–64d combine the signals received from the variable amplitude and phase control elements 62 such that each of the receiving digital beam forming networks 60a–60d outputs a synthesized user signal. Switching networks 66a–66d feed the synthesized user signals to demodulators 68a–68d. As with the receiving beam forming networks 60a–60d, the total number of demodulators corresponds to at least the number of users within the cell 26 of the cellular communication system. Therefore, each of the demodulators 68a–68d demodulates a synthesized user signal from a corresponding beam forming network and outputs a desired user signal assigned to a particular user within the cellular cell 26. As with the modulators 38a–38c of the transmitting network 34, the demodulators 68a–68d employ a spread spectrum communication method including CDMA techniques.

The receiving network 36 is coupled to user tracking assemblies that track each of the users located within the cell 26 according to user signal power ratios with respect to adjacent communication beams 28. The user tracking assemblies provide the receiving and transmitting beam forming networks 60a–60d and 40a–40d with tracking signals for adjusting the transmitting directions of the communication beams 28 in the directions of each of the system users. Each of the transmitting beam forming networks 60a–60d and the demodulators 68a–68d are coupled to user tracking assemblies as represented by user tracking assembly 70b. The operation of the user tracking assemblies of the system will be described with reference to the user tracking assembly 70b.

The representative user tracking assembly 70b is illustrated coupled to beam forming network 60b and the demodulator 68b. The user tracking assembly 70b includes an amplitude comparator 72b and microprocessors 76b and 78b. In order to track the user associated with the user signal assigned to the demodulator 68b and the corresponding adjustable personalized communication beam, the relative amplitudes of the user signal as represented by the adjacent communication beams of beam forming networks 60a and 60c are compared with the amplitude of the user signal as represented by the communication beam from beam forming network 60b. The switching network 66b samples the synthesized user signals outputted by the receiving digital beam forming networks 60a–60c and serially feeds the respective signals to the demodulator 68b. The demodulator 68b demodulates the particular user signal from the sampled synthesized signals and the amplitude comparator 72b compares the relative amplitudes of the particular user signals. The comparator 72b also outputs the desired user signal to the telephone network (not shown) about line 74b. The microprocessors 76b and 78b determine the power ratios of the user signal for the respective communication beams using conventional signal processing techniques. The distance and angle that a particular user is away from a beam's center may be determined from the power ratios. Tracking signals are provided to the receiving digital beam forming network 60b and the transmitting digital beam forming network 40b using lines 80b and 52b. In the same fashion, the other receiving and transmitting beam forming networks receive tracking signals from respective user tracking assemblies about lines 80a, 80c, 80d, 52a, 52c, and 52d.

The tracking signals are used to adjust the amplitude and phase controls 42 and 62 of the transmitting and receiving digital beam forming networks 40a–40d and 60a–60d such that each of the individual personalized communication beams 28 is substantially centered about a particular user within the cell 26. This type of beam tracking also allows for the implementation of user services such as, but not limited to, traffic management, driving directions, and vehicle theft locating.

Figure 6:
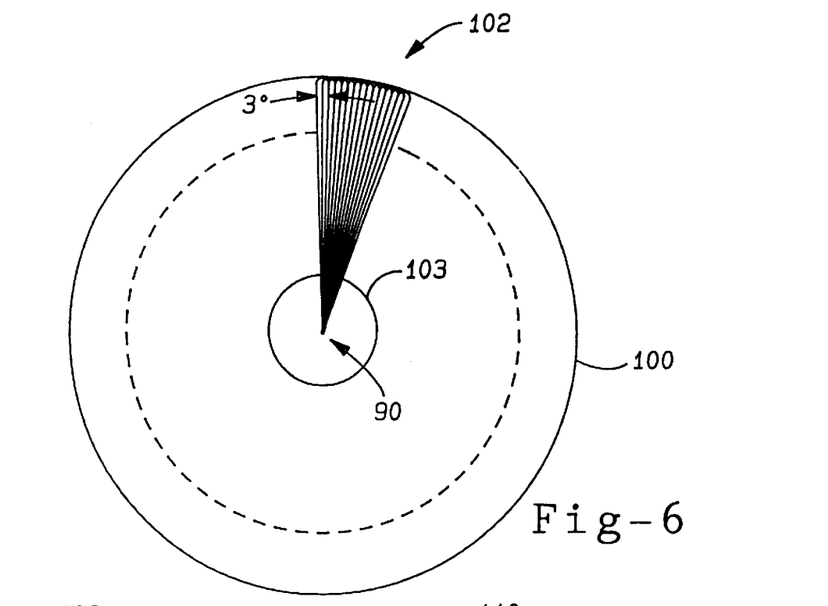
FIG. 6 illustrates the fixed personalized communication beams transmitted by a phased array antenna for providing signal coverage throughout an original geographical cell of the cellular communication system in accordance with a second embodiment of the present invention.

In accordance with the second embodiment of the present invention, the cellular communication system transmits a fixed number of personalized communication beams in fixed directions such that signal coverage is provided throughout an original geographical cell of the system. As illustrated in FIG. 6, the phased array antenna 18 is located substantially at a center location 90 of an original geographical cell 100 of the cellular communication system. The phased array antenna 18 preferably transmits two hundred forty personal communication beams 102, each having a beam width of approximately three degrees. Each of the communication beams 102 overlaps adjacent beams by approximately one and a half degrees. This beam pattern provides the cell 100 with overlapped signal coverage throughout the full three hundred and sixty degree spectrum. As with the first embodiment, each of the personalized communication beams 102 represents user signals assigned to specific users within the cell 100.

As the users travel throughout the cell 100, each are tracked and reassigned to different communication beams 102 that provide the highest signal power ratio based on a user's location. With reference to FIGS. 6 and 8, an omnidirectional antenna 120 may be positioned in closed proximity to the center location 90 for transmitting and receiving an omnidirectional communication beam to users traveling within approximately one half of a mile of the center location 90 as illustrated by circle 103. As with the omnidirectional antenna of the first embodiment, the use of the omnidirectional communication beam improves signal reception and reduces the probability of dropped calls for the users traveling in the close proximity of the center location 90.

Figure 7:
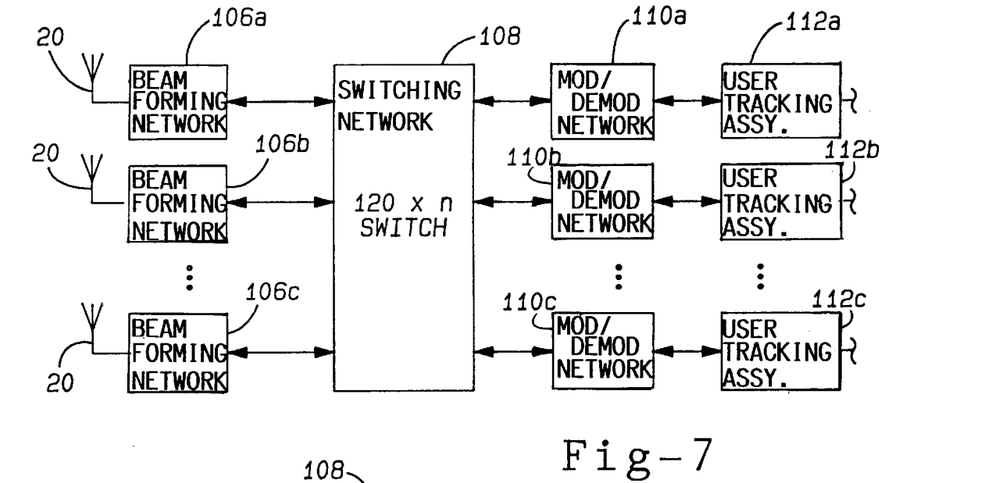
FIG. 7 is a block diagram of the cellular communication system in accordance with the second embodiment of the present invention.

Turning to FIG. 7, a representative portion of the second embodiment of the cellular communication system is illustrated. Three of the one hundred and twenty radiating elements 20 of the phased array antenna 18 are illustrated coupled to three digital beam forming networks 106a–106c. The cellular communication system includes one hundred and twenty of the digital beam forming networks that are represented by networks 106a–106c and are coupled to one of the radiating elements 20. Each of the digital beam forming networks 106a–106c includes a transmit section that transmits the user signals to the radiating elements and includes one of the transmitting digital beam forming networks 40a–40d as illustrated in FIG. 4 along with one of the corresponding digital to analog converters 46a–46d, one of the bandpass filters 48a–48d, and one of the power amplifiers 50a–50d. In addition, each of the digital beam forming networks 106a–106c includes a receiving section that receives the user signals from the radiating elements and includes one of the receiving digital beam forming networks 60a–60d illustrated in FIG. 5 along with one of the combined pre-amplifier and analog to digital converter networks 56a–56c. In accordance with the second embodiment, each of the amplitude and phase controls elements 42 and 62 are fixed such that the coverage areas of the personalized communication beams 102 are fixed as illustrated in FIG. 6.

A switching network 108 couples each of the digital beam forming networks 106a–106c to modulating/demodulating networks 110a–110c. The total number of modulating/demodulating networks as represented by networks 110a–110c preferably corresponds to at least the number of users located within the cell 100. Each of the modulating/demodulating networks 110a–110c includes one of the modulators 38a–38c and one of the demodulators 68a–68d. As with the first embodiment of the present invention, the modulating/demodulating networks 110a–110c employ a spread spectrum communication method including CDMA techniques such that each of the users within the cell 100 are assigned to a carrier frequency and a code assignment that is retained throughout the cell 100.

The switching network 108 is coupled to user tracking assemblies 112a–112c through the modulating/demodulating networks 110a–110c. The total number of the user tracking assemblies as represented by assemblies 112a–112c corresponds to at least the number of users located within the cell 100. Each of the user tracking assemblies 112a–112c includes an amplitude comparator such as the amplitude comparator 72b illustrated in FIG. 5 for comparing the relative amplitudes of a user signal represented by the fixed communication beams 102. The user tracking assemblies 112a–112c perform the comparison to determine which of the fixed personalized communication beams provides the strongest signal coverage for each of the system users based upon each user's location in the cell 100.

In contrast to the first embodiment wherein the comparison is made to adjust the directions of communication beams 28, the switching network 108 is provided with tracking signals for periodically switching the modulating/demodulating networks 110a–110c between the beam forming networks 106a–106c which, in turn, switches the users between the beams 102. For example, a particular user assigned to modulating/demodulating network 110b may initially be provided with signal coverage though the beam forming network 106b and the fixed communication beam associated therewith. As the user travels throughout the cell 100, the user tracking network 112b compares the relative amplitudes of the user signal as represented by the fixed communication beams adjacent to the user's initial communication beam and determines the signal power ratios. Once it is determined that the particular user would be provided with stronger signal coverage through an adjacent communication beam, the switching network 108 switches or couples the modulating/demodulating network 110b to either of the adjacent beam forming networks 106a or 106c depending on the direction that the user is traveling.

Turning to FIG. 8, the omnidirectional antenna 120 is shown coupled to a preamplifier and analog to digital converter 122 which in turn is coupled to the switching network 108. As previously mentioned, the omnidirectional antenna 120 may be positioned in closed proximity to the center location 90 for transmitting and receiving an omnidirectional communication beam to users within approximately one half of a mile of the center location 90 as illustrated by circle 103. The switching network 108 switches the modulating/demodulating networks 110a–110c between the phased array antenna 18 and the omnidirectional antenna 120 when the user tracking networks 112a–112c determine that a particular user is located within area illustrated by the circle 103. The use of the omnidirectional antenna and omnidirectional personal communication beam reduces the probability of drop calls for users that may be moving rapidly between the communication beams 102.

The foregoing discloses and describes merely exemplary embodiments of the present invention. One skilled in the art will readily recognize from such discussion, and from the accompanying drawings and claims, that various changes, modifications, and variations can be made therein without departing from the spirit and scope of the present invention as defined by the following claims.

What is claimed is:

1. A cellular communication system for transmitting adjustable personalized communication beams in individual directions of a plurality of users located within a geographical cell of the cellular communication system, each of the adjustable personalized communication beams representing user signals assigned to specific users within the geographical cell, comprising:

phased array antenna means, positioned within the geographical cell, for transmitting and receiving the adjustable personalized communication beams;

digital beam forming means for feeding the phased array antenna means with the user signals forming the adjustable personalized communication beams for transmission in the individual directions of the plurality of users and for receiving the user signals received by the phased array antenna means; and user tracking means for providing user tracker information to the digital beam forming means, said user tracking information being a function of at least one user location vector referenced to a center of each adjustable personalized communication beam, whereby the digital beam forming means adjusts each of the user signals in response to the user tracking information so that each of the adjustable personalized communication beams is substantially centered about one of the users.

2. The cellular communication system of claim 1, wherein the phased array antenna means is located substantially at a center location of the geographical cell.

3. The cellular communication system of claim 1, further comprising:

omnidirectional antenna means, positioned in close proximity to a center location of the geographical cell, for transmitting and receiving an omnidirectional communication beam in directions of users within a predetermined range of the center location.

4. The cellular communication system of claim 1, wherein the digital beam forming means includes:

a transmitting network for transmitting the user signals represented by the adjustable personalized communication beams in directions of the plurality of users including:

(a) a plurality of signal modulators corresponding to at least the number of the users for modulating the user signals assigned to each of the users, and (b) a plurality of transmitting digital beam forming networks for feeding the modulated user signals to the phased array antenna means such that each of the adjustable personalized communication beams is transmitted in a direction of a particular user; and a receiving network for receiving the user signals received by the phased array antenna means including:

(a) a plurality of receiving digital beam forming networks for synthesizing the user signals, and (b) a plurality of signal demodulators corresponding to at least the number of the users each coupled to outputs of the receiving digital beam forming networks for demodulating the user signals assigned to each of the users.

5. The cellular communication system of claim 1, wherein the user tracking means includes a plurality of amplitude comparator networks each for comparing relative amplitudes of a particular user signal represented by a first adjustable personalized communication beam and at least two other adjustable personalized communication beams adjacent to the first adjustable personalized communication beam.

6. The cellular communication system of claim 4, wherein the user tracking means includes:

a plurality of amplitude comparator networks, coupled to outputs of the demodulators, each for comparing relative amplitudes of a particular user signal represented by a first adjustable personalized communication beam and at least two other adjustable personalized communication beams adjacent to the first adjustable personalized communication beam; and switching means for providing the user signals represented by the first adjustable personalized communication beam and the at least two other adjacent adjustable personalized communication beams to a demodulator assigned to the first adjustable personalized communication beam.

7. The cellular communication system of claim 4, wherein the signal modulators modulate the user signals using code division multiple access coded spread spectrum signals.

8. The cellular communication system of claim 4, wherein the phased array antenna means includes a plurality of radiating elements for transmitting and receiving the adjustable personalized communication beams.

9. The cellular communication system of claim 8, wherein each of the receiving digital beam forming networks includes variable amplitude and phase control elements corresponding to the number of radiating elements, and wherein each of the transmitting digital beam forming networks includes variable amplitude and phase control elements corresponding to at least the number of the users.

10. A cellular communication system for transmitting a fixed number of personalized communication beams in fixed directions covering a geographical cell of the cellular communication system, each of the personalized communication beams representing user signals assigned to specific users within the geographical cell, comprising:

phased array antenna means, positioned within the geographical cell, for transmitting and receiving the fixed personalized communication beams;

a plurality of digital beam forming networks for feeding the phased array antenna means with the user signals forming the fixed personalized communication beams and for receiving the user signals represented by the fixed personalized communication beams;

a plurality of modulating/demodulating networks corresponding to at least the number of the users for modulating and demodulating the user signals assigned to each of the users;

switching means for switching the plurality of modulating/demodulating networks between the plurality of digital beam forming networks such that each of the users is assigned to a fixed personalized communication beam providing maximum signal coverage; and user tracking means for tracking each of the users and for providing the switching means with user tracking information, said user tracking information being a function of a signal power level of each fixed personalized communication beam, whereby the switching means switches the plurality of modulating/demodulating networks between the plurality of digital beam forming networks.

11. The cellular communication system of claim 10, wherein the phased array antenna means is located substantially at a center location of the geographical cell.

12. The cellular communication system of claim 10, further comprising:
   omnidirectional antenna means, positioned in close proximity to the center location of the geographical cell, for transmitting and receiving an omnidirectional communication beam in directions of users within a predetermined range of the center location of the geographical cell.

13. The cellular communication system of claim 10, wherein the user tracking means includes a plurality of amplitude comparator networks each for comparing relative amplitudes of a particular user signal represented by a first fixed personalized communication beam and at least two other fixed personalized communication beams adjacent to the first fixed personalized communication beam.

14. The cellular communication system of claim 10, wherein the modulating/demodulating networks modulate the user signals using code division multiple access coded spread spectrum signals.

15. The cellular communication system of claim 10, wherein each of the digital beam forming networks include fixed amplitude and phase control elements.

16. The cellular communication system of claim 10, wherein the phased array antenna means includes a number of radiating elements corresponding the number of digital beam forming networks for transmitting and receiving the fixed personalized communication beams.

17. The cellular communication system of claim 10, wherein the phased array antenna means includes a plurality of radiating elements each transmitting the fixed personalized communication beams such that adjacent beams have overlapping signal coverage areas.

18. The cellular communication system of claim 17, wherein the radiating elements transmit substantially two hundred and forty of the fixed personalized communication beams, each the fixed personalized communication beams having a three degree signal coverage area and overlapping adjacent beams by approximately one and a half degrees.

* * * * *